Patented Jan. 24, 1950

2,495,313

UNITED STATES PATENT OFFICE 2,495,313

CONDENSATION OF ACROLEIN WITH MONOHYDRIC SATURATED ALIPHATIC ALCOHOLS

Joseph E. Bludworth and Ronald E. Meyer, Cumberland, Md., assignors to Celanese Corporation of America, a corporation of Delaware No Drawing. Application September 23, 1944, Serial No. 555,582

4 Claims. (Cl. 260—615)

This invention relates to aliphatic aldehydes containing ether linkages which yield polymethylene glycol ethers and higher condensation products thereof on reduction, and relates more particularly to a novel method for the production of said aldehydes.

An object of this invention is to provide an improved process for the production of aliphatic aldehydes containing ether linkages which on reduction yield polymethylene glycol ethers and higher condensation products thereof, which products are valuable for use as solvents, as intermediates in the production of plasticizers and for various other related industrial uses.

Other objects of this invention will appear from the following detailed description.

Ethers of various polymethylene glycols are useful solvents in the preparation of lacquers and other finishes, in the formulation of cleaning solutions, as penetrants in textile printing operations and for many other related industrial uses. Methods whereby said polymethylene glycol ethers may be produced economically and in improved yield will render these compounds more readily available and will, therefore, greatly extend their field of application.

We have now discovered that aliphatic aldehydes containing ether linkages which yield valuable polymethylene glycol ethers on reduction may be formed in excellent yield by a novel process. In accordance with the process of our invention, these aliphatic aldehydes containing ether linkages are obtained when acrolein, or other unsaturated aliphatic aldehyde is condensed with ethyl alcohol, methyl alcohol or other aliphatic, and preferably, lower aliphatic alcohol. The novel condensation reaction of our invention is carried out in a weakly alkaline medium at relatively low temperature while maintaining an inert, oxygen-free gaseous atmosphere over the reaction medium. The condensation products obtained, comprising novel aliphatic aldehydes containing ether linkages may then be subjected to reduction under pressure, employing hydrogen as the reducing agent, whereupon valuable polymethylene glycol ethers are obtained. The mixture of polymethylene glycol compounds which is produced may then be separated by fractional distillation yielding valuable organic compounds of wide industrial application.

This novel condensation reaction is a general one and aliphatic alcohols of the general formula R—OH, wherein R is an alkyl group, may be condensed with one molecule of acrolein, for example, to yield beta-alkoxy-propionaldehydes in accordance with the following reaction,

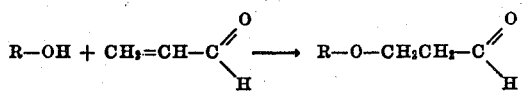

The carbonyl group may then be reduced to yield the corresponding glycol ether.

Thus, for example, in accordance with our novel process, one molecule of acrolein may be reacted with one molecule of methyl alcohol as follows:

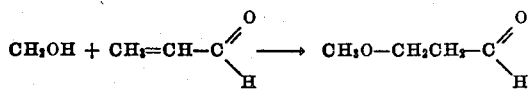

This reaction, which may be described as a monomeric reaction, yields beta-methoxy-propionaldehyde, as shown by the above equation. The reduction of the beta-methoxy-propionaldehyde yields the mono-methyl ether of trimethylene glycol.

Similarly, the reaction of one molecule of ethyl alcohol with a single molecule of acrolein yields beta-ethoxy-propionaldehyde which, on reduction, is converted to the valuable mono-ethyl ether of trimethylene glycol.

Due to the reactivity of the aldehydes, higher condensation products are also produced on further reaction of the initial alcohol-acrolein condensation product with itself or with another molecule of acrolein, or other unsaturated aldehyde.

The secondary, or dimeric, condensation reaction whereby higher molecular weight carbonyl compounds are produced may proceed in each of three different ways. Usually, however, these secondary condensation reactions proceed simultaneously and each particular type of reaction yields a different higher condensation product. For the sake of clarity, these secondary condensation reactions will be identified below as reaction (A), reaction (B) and reaction (C).

Thus, when two molecules of beta-methoxy-propionaldehyde, which is present as the product of the initial monomeric reaction, undergo further reaction with each other in accordance with reaction (A), the reaction proceeds in the following manner.

Reaction (A)

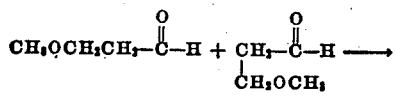

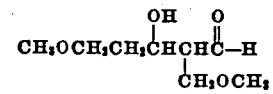

The product of this reaction is 2-methoxymethyl-3-hydroxy-5-methoxy-pentanal-1. In this reaction, as shown above, one molecule of beta-methoxy-propionaldehyde reacts at the carbonyl group and the other at an alpha hydrogen and an aldol condensation is effected. On reduction of the 2-methoxymethyl-3-hydroxy-5-methoxy-pentanal-1 formed by this condensation reaction, 2-methoxymethyl-5-methoxy-pentandiol-1,3

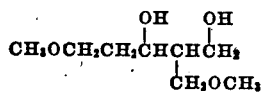

is obtained.

The higher, or dimeric, condensation reactions also proceed in a different manner which, as stated, are termed reactions (B) and (C). Thus, in reaction (B) one molecule of beta-methoxy-propionaldehyde reacts with another molecule of arcrolein and in this reaction it is the carbonyl group of the beta-methoxy-propionaldehyde which reacts with the alpha hydrogen atom of acrolein. The reaction proceeds as follows:

Reaction (B)

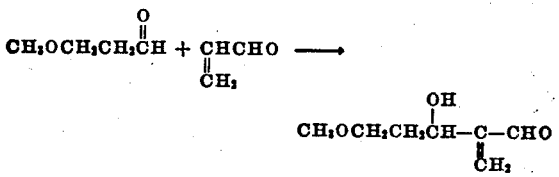

and 2-methylene-3-hydroxy-5-methoxy-pentanal-1 is formed. On reduction, this aldehyde yields

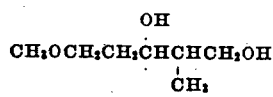

which is 2-methyl-5-methoxy-pentandiol-1,3.

The reaction between one molecule of beta-methoxy-propionaldehyde and another molecule of acrolein may, however, proceed differently and instead of the carbonyl group of the beta-methoxy-propionaldehyde reacting, the carbonyl group of the acrolein molecule reacts and reaction takes place at an alpha hydrogen of the beta-methoxy-propionaldehyde. This action proceeds as follows:

Reaction (C)

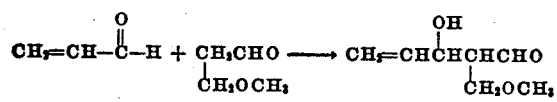

and 2-methoxymethyl-3-hydroxy-pentene-4-al-1 is formed. On reduction, this aldehyde yields

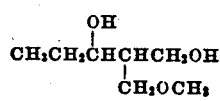

which is 2-methoxymethyl-pentandiol-1,3.

By condensing ethyl alcohol with acrolein as stated, beta-ethoxy-propionaldehyde is obtained. This aldehyde yields the mono-ethyl ether of trimethylene glycol on reduction. By reacting two molecules of beta-ethoxy-propionaldehyde in accordance with reaction (A), there is obtained 2-ethoxymethyl-3-hydroxy-5-ethoxy-pentanal-1.

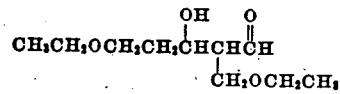

which may be converted to 2-ethoxymethyl-5-ethoxy-pentandiol-1,3 by reduction. When beta-ethoxy-propionaldehyde reacts with one molecule of acrolein in accordance with reaction (B), 2-methylene-3-hydroxy-5-ethoxy-pentanal-1.

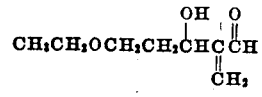

is formed. On reduction, this long chain aldehyde ether is converted into 2-methyl-5-ethoxy-pentandiol-1,3.

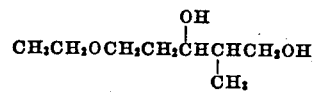

Also, when beta-ethoxy-propionaldehyde reacts with one molecule of acrolein in accordance with reaction (C), 2-ethoxymethyl-3-hydroxy-pentene-4-al-1.

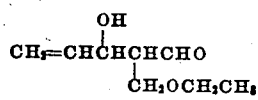

is formed, which on reduction is converted into 2-ethoxymethyl-pentandiol-1,3

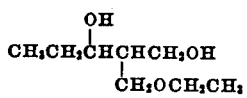

We have also found that higher reaction products may be formed by reaction of yet another molecule of acrolein with the dimeric condensation products of either reaction (B) or reaction (C). This trimeric reaction may, as in the case of the dimeric reaction, proceed in two different ways. Where the reactive carbonyl group is that of the dimeric condensation product, the reaction, which we shall term reaction (D), proceeds as follows where 2-ethoxymethyl-3-hydroxy-pentene-4-al-1, for example, comprises one of the reactants:

Reaction (D)

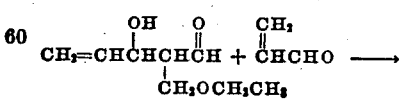

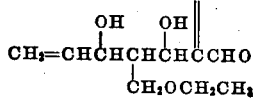

and 2-methylene-4-ethoxymethyl-heptene-6-diol-3,5-al-1 is formed. When this aldehyde is reduced, the corresponding polyhydroxy ether, 4-ethoxymethyl-2-methyl-heptantriol-1,3,5 is produced. Where the reactive carbonyl group is that of the acrolein molecule, the trimeric reaction between 2-ethoxymethyl-3-hydroxy-pentene-4-al-1 and acrolein proceeds similarly to the dimeric reaction (C). Such a trimeric reaction comprises another phase of the condensation reaction and will be termed reaction (E).

Reaction (E)

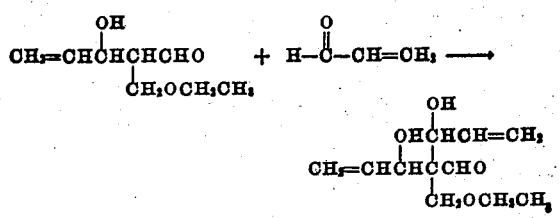

$$CH_2=CHCHCHCHO + H-\overset{O}{\overset{\|}{C}}-CH=CH_2 \longrightarrow$$
$$\underset{CH_2OCH_2CH_3}{|}$$

$$CH_2=CHCH\overset{OH}{\overset{|}{C}}CHO$$
$$\underset{CH_2OCH_2CH_3}{|}\; \overset{|}{\underset{}{OHCHCH=CH_2}}$$

Higher reactions may also take place on prolonged reaction.

The above series of reactions will serve to illustrate the types of compounds our novel reaction yields. In lieu of ethyl or methyl alcohol, other alcohols such as, for example, propyl, isopropyl, butyl, isobutyl, secondary butyl, tertiary butyl, amyl, hexyl, heptyl, octyl, lauryl and other alcohols may be condensed with acrolein to yield these novel aldehydes, and on hydrogenation of the monomeric, dimeric and trimeric condensation products our novel process yields many valuable hydroxy compounds.

Where it is desired to produce a major portion of condensation products of lower average molecular weight, i. e. mainly monomeric, a polymerization inhibitor such as hydroquinone may be employed during the condensation reaction. Lower reaction temperatures and a shorter reaction period as well as a lower molecular ratio of acrolein to alcohol also favors the formation of primarily monomeric or lower molecular weight condensation products. By conducting the condensation reaction so as to limit the degree of condensation, the average molecular weight of the aldehydes and/or glycol ethers, which are produced on reduction of the carbonyl groups present, may be maintained under fairly close control.

In effecting the condensation of acrolein with the desired aliphatic alcohol, the reaction temperature is preferably maintained at from about 0 to about 80° F. and the reaction may be continued for from 30 minutes to 10 hours depending upon the type of reaction product desired. As stated, a short period of reaction, say 30 to 60 minutes, favors the formation of monomeric condensation products where but one molecule of acrolein reacts with one molecule of alcohol, and only a small proportion of dimeric or trimeric products is produced. Nitrogen is preferred as the inert, oxygen-free atmosphere.

The condensation reaction is carried out under alkaline conditions, employing an alkali hydroxide, such as sodium or potassium hydroxide to maintain the desired alkalinity. Usually the alkali hydroxide is added in the form of an alcoholic solution which may be of a concentration of 1 to 15%.

From about 0.2 to 15 mols of alcohol may be reacted with each mol of acrolein. Where an excess of alcohol is present during the condensation, i. e. where 1.5 to 15 mols of alcohol are reacted with one mol of acrolein, a monomeric reaction is favored and the products obtained will be found to be predominantly monomeric in character. By continuing the reaction beyond the optimum period for monomeric reaction, that is, by allowing the reaction to proceed for from 1 to 4 hours, increasing the ratio of acrolein to alcohol and/or increasing the temperature of reaction, dimeric reaction takes place to a greater degree. An additional molecule of acrolein reacts with the original aldehydic condensation product and a larger proportion of those dimers as are formed in accordance with reactions (A), (B) and (C) are obtained. The tertiary or trimeric condensation reaction, wherein trimers are formed due to the reaction of an additional molecule of acrolein with the secondary dimeric reaction product of reactions (B) or (C), also takes place to a greater degree on prolonging the reaction and the formation of such tertiary products is generally indicated by the reactions (D) and (E). Higher molecular weight products may also be obtained under more drastic conditions of reaction.

All of these reactions, of course, take place simultaneously and a mixture of products is usually obtained. By carrying out the condensation with a particular molecular ratio of alcohol and acrolein for a specific period of time and within a particular temperature range, the type of product which will predominate may be closely determined.

The reduction of the aldehyde condensation products is preferably effected by means of hydrogen at pressures of from 800 to 1500 lbs. per sq. inch and at temperatures of 100 to 200° F. employing nickel as the hydrogenation catalyst. Complete reduction of the carbonyl groups is usually effected in from 2 to 6 hours.

In order further to illustrate our invention but without being limited thereto, the following examples are given:

Example I 720 parts by weight of methyl alcohol (22.5 mols) and 100 parts by weight of acrolein (1.8 mols) are mixed together in a suitable vessel and cooled to 32° F. 0.1 parts by weight of hydroquinone are added to the cooled mixture and the air is swept from the vessel by a current of nitrogen. 42 parts by weight of a 1% alcoholic solution of sodium hydroxide are added with agitation, the rate of addition being controlled so that the temperature does not rise above 36° F. The addition of the sodium hydroxide takes about 20 minutes and the reaction is allowed to continue for an additional 10 minutes. The alkali is then neutralized and the solution made slightly acid by the addition of dilute aqueous acetic acid. The odor of acrolein is only faint at this point. A mixture of aldehydes containing ether linkages is obtained and the mixture is hydrogenated at 200° F. under 1000 lbs. per sq. inch hydrogen pressure with 25 parts of Raney nickel as the hydrogenation catalyst. The mixture obtained after hydrogenation is fractionated and the major product obtained is the mono-methyl ether of trimethylene glycol, the reduction product of beta-methoxy-propionaldehyde. Small amounts of both 2-methoxy-methyl-pentandiol-1,3 and 2-methyl-5-methoxy-pentandiol-1,3 are also recovered, indicating that the relatively short reaction time yields a predominantly monomeric product. The yield of monomeric product is 75% based on the acrolein employed.

Example II 400 parts by weight of methyl alcohol (12.5 mols) are cooled to 32° F. in a suitable vessel. The air is swept from the vessel with a current of nitrogen. A total of 420.5 parts by weight of acrolein (7.5 mols) are then added to the cooled alcohol in two stages. The first stage comprises adding 63 parts by weight of acrolein to the cooled methyl alcohol and initiating the condensation reaction by adding 1 part of 1% sodium hydroxide solution to the mixture. The remainder of the acrolein is then added slowly over a 2 hour period, with agitation, while there is simultaneously added 83 parts by weight of 1% alcoholic sodium hydroxide. The mixture is cooled to 34 to 36° F. and maintained at this temperature for an additional three hours. The alkali present is neutralized and the solution made slightly acid (pH-6.5) with dilute aqueous acetic acid. The aldehydic products obtained are then hydrogenated in accordance with the process of Example I. The hydrogenated product is fractionated and the mono-methyl ether of trimethylene glycol recovered therefrom. In addition to this ether, 2-methoxymethyl-pentandiol-1,3 and 2,4-dimethyl-7-methoxy-heptanetriol-1,3,5 are also recovered, the latter being the reduced reaction product of a trimeric reaction wherein beta-methoxy-propionaldehyde reacts with two molecules of acrolein. The dimer, 2-methoxymethyl-pentandiol-1,3 boils at 248° F. at 7 mm. pressure, and has a refractive index at 20° C. of 1.4418. The trimer, 2,4-dimethyl-7-methoxy-heptanetriol-1,3,5, boils in the range 282 to 400° F. at 7 mm. pressure and has a refractive index of 1.4572 at 20° C. The yield based on the acrolein employed comprises 40% of monomer, i. e. the mono-methyl ether of trimethylene glycol, 15% of the dimer and 25% of the trimer, the remainder of the acrolein forming higher condensation products.

*Example III*

396 parts by weight of ethyl alcohol (8.6 mols) are mixed with 63 parts of acrolein (1.1 mols), placed in a suitable vessel and cooled to 32° F. under nitrogen. About 2 parts of 1% alcoholic potassium hydroxide are added until a rise in temperatures indicates the condensation reaction is starting. 147 parts of acrolein (2.6 mols) are then slowly added, together with 40 parts of 1% alcoholic potassium hydroxide, the addition being made over a 1 hour period while maintaining the temperature between 32 to 36° F. by suitable cooling means. After all of the alkali and acrolein are added the reaction is allowed to proceed for one hour longer. The reaction mixture is then made acid with dilute acetic acid, hydrogenated in accordance with the process of Example I and then fractionated. The reduction product obtained is largely the monoethyl ether of trimethylene glycol. The dimeric product 2-ethoxymethyl-pentandiol-1,3 is also obtained, which compound has a boiling point of 260 to 270° F. at 5 mm. pressure and a refractive index of 1.4440 at 20° C. A trimer comprising 2-methyl-4-ethoxymethyl-heptanetriol-1,3,5 is also obtained. The reaction yields 40% of the mono-ethyl ether of trimethylene glycol, 15% of the dimeric product, 20% of trimer and 25% of higher condensation products based on the acrolein employed.

It is to be understood that the foregoing detailed description is given merely by way of illustration and that many variations may be made therein without departing from the spirit of our invention.

Having described our invention, what we desire to secure by Letters Patent is:

1. In a process for the condensation of acrolein with a monohydric saturated aliphatic alcohol in an alkaline reaction medium, the steps which comprise incorporating an acrolein polymerization inhibitor in the reaction mixture and effecting the condensation in an oxygen-free gaseous atmosphere.

2. In a process for the condensation of acrolein with a monohydric saturated aliphatic alcohol in an alkaline reaction medium, the steps which comprise incorporating hydroquinone in the reaction mixture as a polymerization inhibitor and effecting the condensation in an oxygen-free gaseous atmosphere.

3. In a process for the condensation of acrolein with methyl alcohol in an alkaline reaction medium, the steps which comprise incorporating hydroquinone in the reaction mixture as a polymerization inhibitor and effecting the condensation in an oxygen-free gaseous atmosphere.

4. In a process for the condensation of acrolein with methyl alcohol in an alkaline reaction medium, the steps which comprise reacting about 1.8 mols of acrolein with about 22.5 mols of methyl alcohol at a temperature no greater than about 36° F. in an oxygen-free gaseous atmosphere, the reaction mixture containing hydroquinone as a polymerization inhibitor and being rendered alkaline by the addition of an alcoholic solution of sodium hydroxide thereto.

JOSEPH E. BLUDWORTH.
RONALD E. MEYER.

REFERENCES CITED

The following references are of record in the file of this patent:

UNITED STATES PATENTS

| Number | Name | Date |
|---|---|---|
| 1,436,047 | Moreau | Nov. 21, 1922 |
| 1,550,869 | Bogin | Aug. 5, 1925 |
| 2,170,854 | Drake | Aug. 29, 1939 |
| 2,197,467 | Evans | Apr. 16, 1940 |
| 2,215,583 | Heckmaier | Sept. 24, 1940 |
| 2,288,211 | Schulze | June 30, 1942 |
| 2,332,949 | Szlatimay | Oct. 26, 1943 |
| 2,372,540 | Balcar | Mar. 27, 1945 |
| 2,373,464 | Dittmar | Apr. 10, 1945 |
| 2,377,584 | Staudinger | June 5, 1945 |
| 2,408,127 | Seymour | Sept. 24, 1946 |
| 2,434,110 | Hatch | Jan. 6, 1948 |

FOREIGN PATENTS

| Number | Country | Date |
|---|---|---|
| 479,253 | Great Britain | Feb. 2, 1938 |
| 554,949 | Germany | July 15, 1932 |
| 579,651 | Germany | June 29, 1933 |
| 599,836 | Germany | July 11, 1934 |

OTHER REFERENCES

Beilstein (1), "Handbuch der Organischen Chemie," 4th ed., vol. 1, 1st supplement, page 277.
Beilstein (2), vol. 1, 4th ed., page 521.
Beilstein (3), "Handbuch der Organischen Chemie," vol. 1, 4th ed., pages 519, 520, 522.
Beilstein (4), vol. 1, supp. 1, 4th ed., pages 276, 278.

Certificate of Correction

January 24, 1950

Patent No. 2,495,313

JOSEPH E. BLUDWORTH ET AL.

It is hereby certified that errors appear in the printed specification of the above numbered patent requiring correction as follows:

Column 2, line 18, for that portion of the formula reading "$CH_3OH+CH_2=CH$" read $CH_3OH+CH_2=CH$; column 3, lines 48 to 51, inclusive, strike out the formula and insert instead $$CH_3OCH_2CH_2\overset{OH}{\underset{CH_3}{C}}HOHCH_2OH$$

line 61, for the word "action" read *reaction*;

and that the said Letters Patent should be read with these corrections therein that the same may conform to the record of the case in the Patent Office.

Signed and sealed this 30th day of May, A. D. 1950.

[SEAL]

THOMAS F. MURPHY,
*Assistant Commissioner of Patents.*